United States Patent
Knoeppel et al.

(10) Patent No.: US 6,864,207 B2
(45) Date of Patent: *Mar. 8, 2005

(54) ZIEGLER-NATTA CATALYST FOR POLYOLEFINS

(75) Inventors: David W. Knoeppel, League City, TX (US); Tim J. Coffy, Houston, TX (US); Henry Enriquez, Pearland, TX (US); Steven D. Gray, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,546

(22) Filed: Sep. 22, 2003

(65) Prior Publication Data

US 2004/0058802 A1 Mar. 25, 2004

Related U.S. Application Data (63) Continuation-in-part of application No. 09/687,560, filed on Oct. 13, 2000, now Pat. No. 6,693,058, which is a continuation-in-part of application No. 08/789,862, filed on Jan. 28, 1997, now Pat. No. 6,174,971.

(51) Int. Cl.[7] .......................... B01J 31/00; B01J 37/00; C08F 4/02; C08F 4/60
(52) U.S. Cl. ................ 502/110; 502/114; 502/115; 502/132; 502/133; 502/134
(58) Field of Search ................ 502/110, 114, 502/115, 132, 133, 134

(56) References Cited

U.S. PATENT DOCUMENTS

| | | | |
|---|---|---|---|
| 4,107,413 A | 8/1978 | Giannini et al. | 526/114 |
| 4,220,554 A | 9/1980 | Scata | 252/429 |
| 4,294,721 A | 10/1981 | Cecchin et al. | 252/429 |
| 4,387,200 A * | 6/1983 | Gessell et al. | 526/122 |
| 4,439,540 A | 3/1984 | Cecchin et al. | 502/125 |
| 4,460,701 A | 7/1984 | Terano et al. | 502/104 |
| 4,562,173 A | 12/1985 | Terano et al. | 502/127 |
| 5,066,738 A | 11/1991 | Ewen | 526/124 |
| 5,106,804 A | 4/1992 | Bailly et al. | 502/108 |
| 5,153,158 A | 10/1992 | Kioka et al. | 502/126 |
| 5,594,071 A | 1/1997 | Takahashi | 525/240 |
| 6,174,971 B1 * | 1/2001 | Chen et al. | 526/125.3 |
| 6,486,274 B1 * | 11/2002 | Gray et al. | 526/119 |
| 6,693,058 B1 * | 2/2004 | Gray et al. | 502/103 |
| 2004/0058803 A1 * | 3/2004 | Knoeppel et al. | 502/103 |
| 2004/0063572 A1 * | 4/2004 | Kim et al. | 502/115 |

FOREIGN PATENT DOCUMENTS

EP    0 855 409    *   7/1998

\* cited by examiner

Primary Examiner—Mark L. Bell
Assistant Examiner—J. Pasterczyk
(74) Attorney, Agent, or Firm—Madan, Mossman & Sriram (57) ABSTRACT

A process for making a polyolefin catalyst component, catalyst and polymer resin is disclosed. Controlling the viscosity of a catalyst synthesis solution with the addition of aluminum alkyl alters the precipitation of the catalyst component from a catalyst synthesis solution. The average particle size of the catalyst component increases with an increased concentration of aluminum alkyl in the synthesis solution. The catalyst component can be produced by a process comprising contacting a magnesium alkyl compound with an alcohol and an aluminum alkyl to form a magnesium dialkoxide. Catalyst components, catalysts, catalyst systems, polyolefin, products made therewith, and methods of forming each are disclosed. The reaction products can be washed with a hydrocarbon solvent to reduce titanium species [Ti] content to less than about 100 mmol/L.

27 Claims, 1 Drawing Sheet

FIGURE 1

ZIEGLER-NATTA CATALYST FOR POLYOLEFINS

REFERENCE TO RELATED APPLICATION

The present application is a Continuation-in-Part of U.S. patent application Ser. No. 09/687,560, entitled, Ziegler-Natta Catalyst For Narrow to Broad MWD of Polyolefins, Method of Making, Method of Using, And Polyolefins Made Therewith, filed Oct. 13. 2000, which issued as U.S. Pat. No. 6,693,058 on Feb. 17, 2004, incorporated herein by reference, which is a Continuation-in-part of U.S. patent application Ser. No. 08/789,862, entitled, Ziegler-Natta Catalysts for Olefin Polymerization, filed Jan. 28, 1997, which issued as U.S. Pat. No. 6,174,971 on Jan. 16, 2001, also incorporated herein by reference.

BACKGROUND OF THE INVENTION

1. Field of the Invention

The present invention relates generally to catalysts, to methods of making catalysts, to methods of using catalysts, to methods of polymerizing, and to polymers made with such catalysts. More particularly, the present invention relates to polyolefin catalysts and to Ziegler-Natta catalysts, to methods of making such catalysts, to methods of using such catalysts, to polyolefin polymerization, and to polyolefins.

2. Description of the Related Art

Olefins, also called alkenes, are unsaturated hydrocarbons whose molecules contain one or more pairs of carbon atoms linked together by a double bond. When subjected to a polymerization process, olefins can be converted to polyolefins, such as polyethylene and polypropylene. One commonly used polymerization process involves contacting an olefin monomer with a Ziegler-Natta type catalyst system. Many Ziegler-Natta type polyolefin catalysts, their general methods of making, and subsequent use, are well known in the polymerization art. Typically, these systems include a Ziegler-Natta type polymerization catalyst component; a co-catalyst; and an electron donor compound. A Ziegler-Natta type polymerization catalyst component can be a complex derived from a halide of a transition metal, for example, titanium, chromium or vanadium, with a metal hydride and/or a metal alkyl that is typically an organoaluminum compound. The catalyst component is usually comprised of a titanium halide supported on a magnesium compound complexed with an alkylaluminum. There are many issued patents relating to catalysts and catalyst systems designed primarily for the polymerization of propylene and ethylene that are known to those skilled in the art. Examples of such catalyst systems are provided in U.S. Pat. Nos. 4,107,413; 4,294,721; 4,439,540; 4,114,319; 4,220,554; 4,460,701; 4,562,173; 5,066,738, and 6,174,971 which are incorporated by reference herein.

Conventional Ziegler-Natta catalysts comprise a transition metal compound generally represented by the formula: $MR_x$ where M is a transition metal compound, R is a halogen or a hydrocarboxyl, and x is the valence of the transition metal. Typically, M is selected from a group IV to VII metal such as titanium, chromium, or vanadium, and R is chlorine, bromine, or an alkoxy group. Common transition metal compounds are $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$, and $Ti(OC_{12}H_{25})Cl_3$. The transition metal compound is typically supported on an inert solid, e.g., magnesium chloride.

Ziegler-Natta catalysts generally are provided on a support, i.e. deposited on a solid crystalline support. The support can be an inert solid, which is chemically unreactive with any of the components of the conventional Ziegler-Natta catalyst. The support is often a magnesium compound. Examples of the magnesium compounds which can be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The properties of the polymerization catalyst can affect the properties of the polymer formed using the catalyst. For example, polymer morphology typically depends upon catalyst morphology. Good polymer morphology includes uniformity of particle size and shape and an acceptable bulk density. Furthermore, it is desirable to minimize the number of very small polymer particles (i.e., fines) for various reasons, such as for example, to avoid plugging transfer or recycle lines. Very large particles also must be minimized to avoid formation of lumps and strings in the polymerization reactor.

Another polymer property affected by the type of catalyst used is the molecular weight distribution (MWD), which refers to the breadth of variation in the length of molecules in a given polymer resin. In polyethylene for example, narrowing the MWD may improve toughness, i.e., puncture, tensile, and impact performance. On the other hand, a broad MWD can favor ease of processing and melt strength.

While much is known about Ziegler-type catalysts, there is a constant search for improvements in their polymer yield, catalyst life, catalyst activity, and in their ability to produce polyolefins having certain properties.

SUMMARY OF THE INVENTION

One embodiment of the present invention provides a process for making a catalyst comprising: altering the precipitation of a catalyst component from a catalyst synthesis solution by controlling the viscosity of a catalyst synthesis solution with the addition of aluminum alkyls, wherein the average particle size of the catalyst component increases with an increased concentration of aluminum alkyl in the synthesis solution. The process can further comprise contacting the catalyst component with an organometallic preactivating agent to form a catalyst, wherein the average particle size of the catalyst increases with an increased concentration of aluminum alkyl in the synthesis solution.

Another embodiment of the present invention provides a process for making a catalyst comprising: a) contacting a magnesium dialkoxide compound with a halogenating agent to form a reaction product A; b) contacting reaction product A with a first halogenating/titanating agent to form reaction product B; c) contacting reaction product B with a second halogenating/titanating agent to form reaction product C; d) contacting reaction product C with a third halogenating/titanating agent to form reaction product D; and e) contacting reaction product D with an organometallic preactivating agent to form a catalyst. The magnesium dialkoxide compound is a reaction product of a reaction comprising a magnesium alkyl compound of the general formula MgRR', wherein R and R' are alkyl groups of 1–10 carbon atoms and may be the same or different, an alcohol of the general formula R"OH wherein the alcohol is linear or branched and wherein R" is an alkyl group of 2–20 carbon atoms, and an aluminum alkyl of the formula $AlR'''_3$ wherein at least one R''' is an alkyl or alkoxide having 1–8 carbon atoms or a halide, and wherein each R''' may be the same or different. The average particle size of the catalyst increases with an increased aluminum alkyl to magnesium alkyl ratio.

The second and third halogenating/titanating agents can comprise titanium tetrachloride. The second and third halogenating/titanating steps can each comprise a titanium to magnesium ratio in the range of about 0.1 to 5. The reaction products A, B and C can each be washed with a hydrocarbon solvent prior to subsequent halogenating/titanating steps. The reaction product D can be washed with a hydrocarbon solvent until titanium species [Ti] content is less than about 100 mmol/L.

Even another embodiment of the present invention provides a polyolefin polymer produced by a process comprising: a) contacting one or more olefin monomers together in the presence of a catalyst of the invention, under polymerization conditions; and b) extracting polyolefin polymer. The average particle size of the polymer increases with an increased aluminum alkyl to magnesium alkyl ratio utilized in the catalyst preparation. Generally the monomers are ethylene monomers and the polymer is polyethylene.

Yet another embodiment of the present invention provides a film, fiber, pipe, textile material or article of manufacture comprising polymer produced by the present invention. The article of manufacture can be a film comprising at least one layer comprising a polymer produced by the present invention.

DETAILED DESCRIPTION OF THE INVENTION

According to one embodiment of the invention, a method for making a catalyst component generally includes the steps of forming a metal dialkoxide from a metal dialkyl, aluminum alkyl, and an alcohol, halogenating the metal dialkoxide to form a reaction product, contacting the reaction product with one or more halogenating/titanating agent in three or more steps to form a catalyst component, and then treating the catalyst component with a preactivation agent such as an organoaluminum.

One embodiment of the present invention can be generally as follows:

1. $MRR' + 2R''OH + AlR_3 \rightarrow M(OR'')_2$
2. $M(OR'')_2 + ClAR'''_x \rightarrow$ "A"
3. "A" $+ TiCl_4/Ti(OR'''')_4 \rightarrow$ "B"
4. "B" $+ TiCl_4 \rightarrow$ "C";
5. "C" $+ TiCl_4 \rightarrow$ "D"
6. "D" + preactivating agent → catalyst In the above formulas, M can be any suitable metal, usually a Group IIA metal, typically Mg. In the above formulas, R, R', R'', R''', and R'''' are each independently hydrocarbyl or substituted hydrocarbyl moieties, with R and R' having from 1 to 20 carbon atoms, generally from 1 to 10 carbon atoms, typically from 2 to 6 carbon atoms, and can have from 2 to 4 carbon atoms. R'' generally comprises from 3 to 20 carbon atoms, R''' generally comprises from 2–6 carbon atoms, and R'''' generally comprises from 2–6 carbon atoms and is typically butyl. Any combination of two or more of R, R', R'', R''', and R'''' can be used, may be the same, or the combination of the R groups may be different from one another.

In the above embodiment comprising formula $ClAR'''_x$, A is a nonreducing oxyphilic compound which is capable of exchanging one chloride for an alkoxide, R''' is a hydrocarbyl or substituted hydrocarbyl, and x is the valence of A minus 1. Examples of A include titanium, silicon, aluminum, carbon, tin and germanium, typically is titanium or silicon wherein x is 3. Examples of R''' include methyl, ethyl, propyl, isopropyl and the like having 2–6 carbon atoms. Nonlimiting examples of a chlorinating agent that can be used in the present invention are $ClTi(O^iPr)_3$ and $ClSi(Me)_3$.

The metal dialkoxide of the above embodiment is chlorinated to form a reaction product "A". While the exact composition of product "A" is unknown, it is believed that it contains a partially chlorinated metal compound, one example of which may be $ClMg(OR'')$.

Reaction product "A" is then contacted with one or more halogenating/titanating agent, such as for example a combination of $TiCl_4$ and $Ti(OBu)_4$, to form reaction product "B". Reaction product "B" which is probably a complex of chlorinated and partially chlorinated metal and titanium compounds. Reaction product "B" can comprise a titanium impregnated $MgCl_2$ support and for example, may possibly be represented by a compound such as $(MCl_2)_y(TiCl_x(OR)_{4-x})_z$. Reaction product "B" can be precipitated as a solid from the catalyst slurry.

The second halogenation/titanation step produces reaction product, or catalyst component, "C" which is also probably a complex of halogenated and partially halogenated metal and titanium compounds but different from "B" and may possibly be represented by $(MCl_2)_y(TiCl_{x'}(OR)_{4-x'})_{z'}$. It is expected that the level of halogenation of "C" would be greater than that of product "B". This greater level of halogenation can produce a different complex of compounds.

The third halogenation/titanation step produces a reaction product, or catalyst component, "D" which is also probably a complex of halogenated and partially halogenated metal and titanium compounds but different from "B" and "C", and may possibly be represented by $(MCl_2)_y(TiCl_{x''}(OR)_{4-x''})_{z''}$. It is expected that the level of halogenation of "D" would be greater than that of product "C". This greater level of halogenation would produce a different complex of compounds. While this description of the reaction products offers the most probable explanation of the chemistry at this time, the invention as described in the claims is not limited by this theoretical mechanism.

Metal dialkyls and the resultant metal dialkoxides suitable for use in the present invention can include any that can be utilized in the present invention to yield a suitable polyolefin catalyst. These metal dialkoxides and dialkyls can include Group IIA metal dialkoxides and dialkyls. The metal dialkoxide or dialkyl can be a magnesium dialkoxide or dialkyl. Non-limiting examples of suitable magnesium dialkyls include diethyl magnesium, dipropyl magnesium, dibutyl magnesium, butylethylmagnesium, etc. Butylethylmagnesium (BEM) is one suitable magnesium dialkyl.

In the practice of the present invention, the metal dialkoxide can be a magnesium compound of the general formula $Mg(OR'')_2$ where R'' is a hydrocarbyl or substituted hydrocarbyl of 1 to 20 carbon atoms.

The metal dialkoxide can be soluble and is typically non-reducing. A non-reducing compound has the advantage of forming $MgCl_2$ instead of insoluble species that can be formed by the reduction of compounds such as MgRR', which can result in the formation of catalysts having a broad particle size distribution. In addition, $Mg(OR'')_2$, which is less reactive than MgRR', when used in a reaction involving chlorination with a mild chlorinating agent, followed by subsequent halogenation/titanation steps, can result in a more uniform product, e.g., better catalyst particle size control and distribution.

Non-limiting examples of species of metal dialkoxides which can be used include magnesium butoxide, magnesium pentoxide, magnesium hexoxide, magnesium di(2-ethylhexoxide), and any alkoxide suitable for making the system soluble.

As a non-limiting example, magnesium dialkoxide, such as magnesium di (2-ethylhexoxide), may be produced by reacting an alkyl magnesium compound (MgRR') with an alcohol (ROH) and an aluminum alkyl (AlR$_3$), as shown below.

$$XAlR_3+MgRR'+(2+3X)R"OH \rightarrow Mg(OR")_2+RH+R'H$$

The reaction can take place at room temperature and the reactants form a solution. R and R' may each be any alkyl group of 1–10 carbon atoms, and may be the same or different. Suitable MgRR' compounds include, for example, diethyl magnesium, dipropyl magnesium, dibutyl magnesium and butyl ethyl magnesium. The MgRR' compound can be BEM, wherein RH and R'H are butane and ethane, respectively.

In the practice of the present invention, any alcohol yielding the desired metal dialkoxide may be utilized. Generally, the alcohol utilized may be any alcohol of the general formula R"OH where R" is an alkyl group of 2–20 carbon atoms, the carbon atoms can be at least 3, at least 4, at least 5, or at least 6 carbon atoms. Non-limiting examples of suitable alcohols include ethanol, propanol, isopropanol, butanol, isobutanol, 2-methyl-pentanol, 2-ethylhexanol, etc. While it is believed that almost any alcohol may be utilized, linear or branched, a higher order branched alcohol, for example, 2-ethyl-1-hexanol, can be utilized.

The amount of alcohol added can vary, such as within a non-exclusive range of 0 to 10 equivalents, is generally in the range of about 0.5 equivalents to about 6 equivalents (equivalents are relative to the magnesium or metal compound throughout), and can be in the range of about 1 to about 3 equivalents.

Alkyl metal compounds can result in a high molecular weight species that is very viscous in solution. This high viscosity may be reduced by adding to the reaction an aluminum alkyl such as, for example, triethylaluminum (TEAl), which can disrupt the association between the individual alkyl metal molecules. The typical ratio of alkyl aluminum to metal can range from 0.001:1 to 1:1, can be 0.01 to 0.5:1 and also can range from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and can range from 0.1:1 to 1:1.

Agents useful in the step of halogenating the metal alkoxide include any halogenating agent which when utilized in the present invention will yield a suitable polyolefin catalyst. The halogenating step can be a chlorinating step where the halogenating agent contains a chloride (i.e, is a chlorinating agent).

Halogenating of the metal alkoxide compound is generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is generally in the range of about 6:1 to about 1:3, can be in the range of about 3:1 to about 1:2, can be in the range of about 2:1 to about 1:2, and can also be about 1:1.

The halogenating step is generally carried out at a temperature in the range of about 0° C. to about 100° C. and for a reaction time in the range of about 0.5 to about 24 hours. The halogenating step can be carried out at a temperature in the range of about 20° C. to about 90° C. and for a reaction time in the range of about 1 hour to about 4 hours.

Once the halogenating step is carried out and the metal alkoxide is halogenated, the halide product "A" can be subjected to two or more halogenating/titanating treatments.

The halogenation/titanation agents utilized can be blends of two tetra-substituted titanium compounds with all four substituents being the same and the substituents being a halide or an alkoxide or phenoxide with 2 to 10 carbon atoms, such as TiCl$_4$ or Ti(OR"")$_4$. The halogenation/titanation agent utilized can be a chlorination/titanation agent.

The halogenation/titanation agent may be a single compound or a combination of compounds. The method of the present invention provides an active catalyst after the first halogenation/titanation; however, there are desirably a total of at least three halogenation/titanation steps.

The first halogenation/titanation agent is typically a mild titanation agent, which can be a blend of a titanium halide and an organic titanate. The first halogenation/titanation agent can be a blend of TiCl$_4$ and Ti(OBu)$_4$ in a range from 0.5:1 to 6:1 TiCl$_4$/Ti(OBu)$_4$, the ratio can be from 2:1 to 3:1. It is believed that the blend of titanium halide and organic titanate react to form a titanium alkoxyhalide, Ti(OR)$_a$X$_b$, where OR and X are alkoxide and halide, respectively and a+b is the valence of titanium, which is typically 4.

In the alternative, the first halogenation/titanation agent may be a single compound. Examples of a first halogenation/titanation agent are Ti(OC$_2$H$_5$)$_3$Cl, Ti(OC$_2$H$_5$)$_2$Cl$_2$, Ti(OC$_3$H$_7$)$_2$Cl$_2$, Ti(OC$_3$H$_7$)$_3$Cl, Ti(OC$_4$H$_9$)Cl$_3$, Ti(OC$_6$H$_{13}$)$_2$Cl$_2$, Ti(OC$_2$H$_5$)$_2$Br$_2$, and Ti(OC$_{12}$H$_5$)Cl$_3$.

The first halogenation/titanation step is generally carried out by first slurrying the halogenation product "A" in a hydrocarbon solvent at room temperature/ambient temperature. Nonlimiting examples of suitable hydrocarbons solvent include heptane, hexane, toluene, octane and the like. The product "A" can be at least partially soluble in the hydrocarbon solvent.

A solid product "B" is precipitated at room temperature following the addition of the halogenation/titanation agent to the soluble product "A". The amount of halogenation/titanation agent utilized must be sufficient to precipitate a solid product from the solution. In general, the amount of halogenation/titanation agent utilized, based on the ratio of titanium to metal, will generally be in the range of about 0.5 to about 5, typically in the range of about 1 to about 4, and can be in the range about 1.5 to about 2.5.

The solid product "B" precipitated in this first halogenation/titanation step is then recovered by any suitable recovery technique, and then washed at room/ambient temperature with a solvent, such as hexane. Generally, the solid product "B" is washed until the [Ti] is less than about 100 mmol/L. Within the present invention [Ti] represents any titanium species capable of acting as a second generation Ziegler catalyst, which would comprise titanium species that are not part of the reaction products as described herein. The resulting product "B" is then subjected to a second and third halogenating/titanating steps to produce products "C" and "D". After each halogenating/titanating step the solid product can be washed until the [Ti] is less than a desired amount. For example, less than about 100 mmol/L, less than about 50 mmol/L, or less than about 10 mmol/L. After the final halogenating/titanating step, the product can be washed until the [Ti] is less than a desired amount, for example, less than about 20 mmol/L, less than about 10 mmol/L, or less than about 1.0 mmol/L. It is believed that a lower [Ti] can produce improved catalyst results by reducing the amount of titanium that can act as a second generation Ziegler species. It is believed that a lower [Ti] can be a factor in producing improved catalyst results such as a narrower MWD.

The second halogenation/titanation step is generally carried out by slurrying the solid product recovered from the first titanation step, solid product "B", in a hydrocarbon solvent. Hydrocarbon solvents listed as suitable for the first halogenation/titanation step may be utilized. The second and third halogenation/titanation steps can utilize a different compound or combination of compounds from the first halogenation/titanation step. The second and third halogenation/titanation steps can utilize the same agent at a concentration that is stronger than that used in the first halogenation/titanation agent, but this is not a necessity. The second and third halogenating/titanating agents can be a titanium halide, such as titanium tetrachloride ($TiCl_4$). The halogenation/titanation agent is added to the slurry. The addition can be carried out at ambient/room temperature, but can also be carried out at temperatures and pressures other than ambient.

Generally, the second and third halogenation/titanation agents comprise titanium tetrachloride. Typically the second and third halogenation/titanation steps each comprise a titanium to magnesium ratio in a range of about 0.1 to 5, a ratio of about 2.0 can also be used, and a ratio of about 1.0 can be used. The third halogenation/titanation step is generally carried out at room temperature and in a slurry, but can also be carried out at temperatures and pressures other than ambient.

The amount of titanium tetrachloride utilized, or alternate halogenation/titanation agent, may also be expressed in terms of equivalents, an equivalent herein is amount of titanium relative to the magnesium or metal compound. The amount of titanium of each of the second and third halogenating/titanating steps will generally be in the range of about 0.1 to about 5.0 equivalents, can be in the range of about 0.25 to about 4 equivalents, typically is in the range of about 0.3 to about 3 equivalents, and it can be desirable to be in the range of about 0.4 to about 2.0 equivalents. In one particular embodiment, the amount of titanium tetrachloride utilized in each of the second and third is halogenation/titanation steps is in the range of about 0.45 to about 1.5 equivalent.

The catalyst component "D" made by the above described process may be combined with an organometallic catalyst component (a "preactivating agent") to form a preactivated catalyst system suitable for the polymerization of olefins. Typically, the preactivating agents which are used together with the transition metal containing catalyst component "D" are organometallic compounds such as aluminum alkyls, aluminum alkyl hydrides, lithium aluminum alkyls, zinc alkyls, magnesium alkyls and the like.

The preactivating agent is generally an organoaluminum compound. The organoaluminum preactivating agent is typically an aluminum alkyl of the formula $AlR_3$ wherein at least one R is an alkyl having 1–8 carbon atoms or a halide, and wherein each of the R may be the same or different. The organoaluminum preactivating agent can be a trialkyl aluminum such as, for example, trimethyl aluminum (TMA), triethyl aluminum (TEAl) and triisobutyl aluminum (TiBAl). The ratio of Al to titanium can be in the range from 0.1:1 to 2:1 and typically is 0.25:1 to 1.2:1.

Optionally, the Ziegler-Natta catalyst may be pre-polymerized. Generally, a prepolymerization process is affected by contacting a small amount of monomer with the catalyst after the catalyst has been contacted with the co-catalyst. A pre-polymerization process is described in U.S. Pat. Nos. 5,106,804; 5,153,158; and 5,594,071, hereby incorporated by reference.

The catalyst of the present invention may be used in any process for the homopolymerization or copolymerization of any type of α-olefins. For example, the present catalyst can be useful for catalyzing ethylene, propylene, butylene, pentene, hexene, 4-methylpentene and other α-alkenes having at least 2 carbon atoms, and also for mixtures thereof. Copolymers of the above can produce desirable results such as broader MWD and multi-modal distributions such as bimodal and trimodal properties. The catalysts of the present invention can be utilized for the polymerization of ethylene to produce polyethylene.

Various polymerization processes can be employed with the present invention, such as for example, single and/or multiple loop processes, batch processes or continous processes not involving a loop-type reactor. An example of a multiple loop process that can employ the present invention is a double loop system in which the first loop produces a polymerization reaction in which the resulting polyolefin has a lower MW than the polyolefin produced from the polymerization reaction of the second loop, thereby producing a resultant resin having broad molecular weight distribution and/or bimodal characteristics. In the alternative, another example of a multiple loop process that can employ the present invention is a double loop system in which the first loop produces a polymerization reaction in which the resulting polyolefin has a greater MW than the polyolefin produced from the polymerization reaction of the second loop, thereby producing a resultant resin having broad molecular weight distribution and/or bimodal characteristics.

The polymerization process maybe, for example, bulk, slurry or gas phase. A catalyst of the invention can be used in slurry phase polymerization. Polymerization conditions (e.g., temperature and pressure) are dependent upon the type of equipment utilized in the polymerization process, as well as the type of polymerization process utilized, and are known in the art. Generally, the temperature will be in a range of about 50–110° C., and the pressure in a range of about 10–800 psi.

The activity of the resulting catalyst of embodiments of the present invention is at least partially dependent upon the polymerization process and conditions, such as, for example, equipment utilized and temperature of reaction. For example in the embodiment of polymerization of ethylene to produce polyethylene, generally the catalyst will have an activity of at least 5,000 g PE/g catalyst but can have an activity of greater than 50,000 g PE/g catalyst, and the activity may be greater than 100,000 g PE/g catalyst.

Additionally, the resulting catalyst of the present invention can provide a polymer with improved fluff morphology. Thus, the catalyst of the present invention can provide for large polymer particles with a uniform distribution of sizes, wherein fine particles (less than about 125 microns) are only present in low concentrations, such as for example, less than 2% or less than 1%. The catalysts of the present invention, which include large, readily transferred powders with high powder bulk densities, are amenable to polymerization production processes. Generally the catalysts of the invention provide polymer with fewer fines and higher bulk densities (B.D.) wherein the B.D. value can be greater than about 0.31 g/cc, can be greater than about 0.33 g/cc, and can even be greater than about 0.35 g/cc.

The olefin monomer may be introduced into the polymerization reaction zone in a diluent that is a nonreactive heat transfer agent that is a liquid at the reaction conditions. Examples of such a diluent are hexane and isobutane. For the copolymerization of ethylene with another alpha-olefin, such as, for example, butene or hexene, the second alpha-olefin may be present at 0.01–20 mole percent, and can be present at between about 0.02–10 mole percent.

Optionally, an electron donor may be added with the halogenation agent, the first halogenation/titanation agent, or the subsequent halogenation/titanation agent or agents. It may be desirable to have an electron donor utilized in the second halogenation/titanation step. Electron donors for use in the preparation of polyolefin catalysts are well known, and any suitable electron donor may be utilized in the present invention that will provide a suitable catalyst. Electron donors, also known as Lewis bases, are organic compounds of oxygen, nitrogen, phosphorous, or sulfur which can donate an electron pair to the catalyst.

The electron donor may be a monofunctional or polyfunctional compound, can be selected from among the aliphatic or aromatic carboxylic acids and their alkyl esters, the aliphatic or cyclic ethers, ketones, vinyl esters, acryl derivatives, particularly alkyl acrylates or methacrylates and silanes. An example of a suitable electron donor is di-n-butyl phthalate. A generic example of a suitable electron donor is an alkylsilylalkoxide of the general formula $RSi(OR')_3$, e.g., methylsilyltriethoxide [$MeSi(OEt_3)$], where R and R' are alkyls with 1–5 carbon atoms and may be the same or different.

For the polymerization process, an internal electron donor can be used in the synthesis of the catalyst and an external electron donor or stereoselectivity control agent (SCA) to activate the catalyst at polymerization. An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate.

External donors which may be utilized in the preparation of a catalyst according to the present invention include organosilane compounds such as alkoxysilanes of general formula $SiR_m(OR')_{4-m}$ where R is selected from the group consisting of an alkyl group, a cycloalkyl group, an aryl group and a vinyl group; R' is an alkyl group; and m is 0–3, wherein R may be identical with R'; when m is 0, 1 or 2, the R' groups may be identical or different; and when m is 2 or 3, the R groups may be identical or different.

The external donor of the present invention can be selected from a silane compound of the following formula:

wherein $R_1$ and $R_4$ are both an alkyl or cycloalkyl group containing a primary, secondary or tertiary carbon atom attached to the silicon, $R_1$ and $R_4$ being the same or different; $R_2$ and $R_3$ are alkyl or aryl groups. $R_1$ maybe methyl, isopropyl, cyclopentyl, cyclohexyl or t-butyl; $R_2$ and $R_3$ may be methyl, ethyl, propyl, or butyl groups and not necessarily the same; and $R_4$ may also methyl, isopropyl, cyclopentyl, cyclohexyl or t-butyl. Specific external donors are cyclohexylmethydimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

Polyethylene produced using the above described catalyst can have an MWD of at least 5.0, and can be greater than about 6.0.

The polyolefins of the present invention are suitable for use in a variety of applications such as, for example, an extrusion process, to yield a wide range of products. These extrusion processes include, for example, blown film extrusion, cast film extrusion, slit tape extrusion, blow molding, pipe extrusion, and foam sheet extrusion. These processes may comprise mono-layer extrusion or multi-layer coextrusion.

End use applications that can be made utilizing the present invention can include, for example, films, fibers, pipe, textile material, articles of manufacture, diaper components, feminine hygiene products, automobile components and medical materials.

All references cited herein, including research articles, all U.S. and foreign patents and patent applications, are specifically and entirely incorporated by reference.

EXAMPLES

The invention having been generally described, the following examples are provided merely to illustrate certain embodiments of the invention, and to demonstrate the practice and advantages thereof. It is understood that the examples are given by way of illustration and are not intended to limit the scope of the specification or the claims in any manner.

The synthetic scheme employed for this family of catalysts is as follows (all ratios are relative to BEM):

The optimal formulation was regarded as X=0.5 to 2, with zero to two washes prior to preactivation of catalyst C with TEAl. The following modifications were made to the catalyst preparation for a more effective titanation:

As shown, TiCl$_4$ addition is completed in two steps where X and Y=0.5 to 1.0. Catalyst C is generally washed one to two times, while two washes are completed after Y to remove soluble titanium species that act as second generation Ziegler species.

Example 1

In the nitrogen purge box, 1412.25 g (2.00 moles) of BEM-1, 27.60 g (0.060 moles) of TEAl (24.8% in heptane), and 189.70 g (1.20 moles) of DIAE were added to a 3 L round bottom flask. The contents were then transferred to the 20 L Buchi reactor via cannula under a nitrogen flow. The flask was then rinsed with approximately 400 ml of hexane which was transferred to the reactor. The stirrer was set to 350 rpm.

The 2-ethylhexanol (543.60 g, 4.21 moles) was added to a 1 L bottle and capped. It was then diluted to a total volume of 1 L with hexane prior to addition to the reactor. This solution was transferred to the reactor via cannula using the mass flow controller. The initial head temperature was 25.3° C. and reached a maximum temperature of 29.6° C. Following the addition (approximately 2 hours), the bottle was rinsed with 400 ml of hexane which was transferred to the reactor. The reaction mixture was left stirring at 350 rpm overnight under a nitrogen pressure of 0.5 bar and the heat exchanger was turned off.

The heat exchanger was turned on and set to 25° C. The chlorotitanium triisopropoxide was added to two 1 L bottles (774.99 and 775.01 g, 2.00 total moles) to give a total of two liters. The contents of each bottle were transferred to the reactor via cannula using the mass flow controller. The initial head space temperature was 24.6° C. and reached a maximum temperature of 25.9° C. during the addition of the second bottle. The addition times were 145 and 125 minutes for bottles 1 and 2, respectively. After the addition, each bottle was rinsed with 200 ml of hexane which was transferred to the reactor. The reaction mixture was left stirring at 350 rpm overnight under nitrogen pressure of 0.5 bar. The heat exchanger was turned off.

Preparation of $TiCl_4/Ti(OBu)_4$ The titanium tetrachloride/titanium tetrabutoxide mixtures were prepared in a 5 liter round bottom flask using standard schlenk line techniques. In a 1 L pressure bottle, 680.00 g (1.99 moles) of $Ti(OBu)4$ was diluted to 1 L total volume with hexane. This solution was then cannula transferred to the reactor. The bottle was rinsed with 200 ml of hexane and transferred to the reactor. In a 1 L measuring cylinder, 440 ml (~760 g, 4.00 moles) of $TiCl_4$ was diluted to a total volume of 1 L with hexane. The solution in the 5 liter flask was stirred and the $TiCl_4$ solution was added to the reactor dropwise under $N_2$ pressure via cannula. After the addition was complete, the 1 L cylinder was rinsed with 200 ml of hexane which was transferred to the reactor. After 1 hour, the reaction mixture was diluted to 4 L total volume with hexane and stored in the flask prior to use.

The heat exchanger was turned on and set to 25° C. The $TiCl_4/Ti(OBu)_4$ mixture was transferred to the 20 liter reactor via cannual and mass flow controller. The initial head space temperature was 24.7° C. and reached a maximum temperature of 26.0° C. during the 225 minute addition. Following the additions, the vessel was rinsed with one liter of hexane and allowed to stir for 1 hour.

The stirrer was turned off and the solution allowed to settle for 30 minutes. The solution was decanted by pressuring the reactor to 1 bar, lowering the dip tube, and making sure no solid catalyst came through the attached clear plastic hose. The catalyst was then washed three times using the following procedure. Using a pressure vessel on a balance, 2.7 kg of hexane was weighed into the vessel and then transferred to the reactor. The stirrer was turned on and the catalyst mixture was agitated for 15 minutes. The stirrer was then turned off and the mixture was allowed to settle for 30 minutes. This procedure was repeated. After the third addition of hexane, the slurry was allowed to settle overnight and the heat exchanger was turned off.

The supernatant was decanted, and 2.0 kg of hexane added to the reactor. Stirring was resumed at 350 rpm and the heat exchanger was turned on and set to 25° C. In a one liter graduated cylinder, 440 milliliters (760 g, 4.00 moles) of titanium tetrachloride were added. The $TiCl_4$ was diluted to one liter with hexane, and half of the solution was transferred to the reactor via cannula and mass flow controller. The initial head temperature of 24.7° C. increased 0.5° C. during the addition. The total addition time was 45 minutes. After one hour, the stirrer was turned off and the solids were allowed to settle for 30 minutes. The supernatant was decanted, and the catalyst was washed once with hexane following the procedures described above. After the wash was complete, 2.0 kg of hexane was transferred to the reactor and the agitation was resumed. The second $TiCl_4$ drop was completed in a similar manner to that described above using the remaining 500 milliliters of solution. Following the addition, the cylinder was rinsed with 400 milliliters of hexane, which was added to the Buchi. After one hour of reaction, the stirrer was turned off and the solids were allowed to settle for 30 minutes. The supernatant was then decanted, and the catalyst washed three times with hexane. 2.0 kg of hexane was then transferred to the reactor.

In a one liter pressure bottle, 144.8 g (312 mmol) of TEAl (25.2% in hexane) were added. The bottle was capped and diluted to one liter with hexane. This solution was then transferred to the reaction mixture via cannula using the mass flow controller. During the 120 minute addition, the color of the slurry turned dark brown. The initial head temperature was 24.5° C. and reached a maximum temperature of 25.3° C. Following the addition, the bottle was rinsed with 400 milliliters of hexane, which was transferred to the reactor. After 1 hour of reaction, the stirrer was shut off and the catalyst was allowed to settle for 30 minutes. The supernatant was decanted and the catalyst was washed once following the procedures previously described. Following the wash, 2.7 kg of hexane was added to the reactor. The contents were then transferred to a three gallon pressure vessel. The Buchi was rinsed with 1.0 kg and 0.5 kg of hexane, which were added to the pressure vessel. Estimated catalyst yield was 322 g.

In one embodiment the composition in weight percent was: Cl 53.4%; Al 2.3%; Mg 11.8% and Ti at 7.9%. Observed ranges for each element were: Cl at 48.6–55.1%; Al at 2.3–2.5%; Mg at 11.8–14.1%; and Ti of 6.9–8.7%. Ranges for each element can be: Cl at 40.0–65.0%; Al at 0.0–6.0%; Mg at 6.0–15.0%; and Ti of 2.0–14.0%.

Table 1 lists the [Ti] measured from samples after the $TiCl4/Ti(OBu)_4$ addition, three washes, a first $TiCl_4$ addition, one wash and the second $TiCl_4$ addition and three subsequent washes. Decants 1–4 are following the $TiCl4/Ti(OBu)_4$ addition. Decants 5 and 6 are following the first $TiCl_4$ addition. Decants 7–10 follow the second $TiCl_4$ addition.

TABLE 1

| Decant Sample | Ti | (ppm) | mmol/L |
| --- | --- | --- | --- |
| 1 | 2.1 | 21000 | 306.9 |
| 2 | 0.8 | 8000 | 116.9 |
| 3 | 0.2 | 2000 | 29.2 |
| 4 | 0.1 | 1000 | 14.6 |
| 5 | 2 | 20000 | 292.3 |
| 6 | 0.4 | 4000 | 58.5 |
| 7 | 1.9 | 19000 | 277.7 |
| 8 | 0.4 | 4000 | 58.5 |
| 9 | 0.0925 | 925 | 13.5 |
| 10 | 0.0064 | 64 | 0.9 |

Comparative Example 1

Comparative Example 1 was prepared in a similar manner to that of Example 1 except the third titanation was omitted and the second titantion was carried out employing one fourth of the quantity of $TiCl_4$ Comparative Example 2

Comparative Example 2 was prepared in a similar fashion to Example 1 except a second and third titantion step was performed employing 0.5 equivalents of $TiCl_4$ during each titanation step.

Comparative Example 3

Comparative Example 3 was prepared in a similar manner to Comparative Example 1 except the quantity of $TiCl_4$ employed during the second titanation was approximately four times that used during Comparative Example 1. One hexane wash was performed following the second titanation. In one embodiment the composition in weight percent was: Cl 57.0%; Al 2.0%; Mg 9.5% and Ti at 10.0%. Ranges for each element can be; Cl at 55.0–57.0%; Al at 2.0–2.6%; Mg at 8.9–9.5%; and Ti of 10.0–11.0%.

Comparative Example 4

Comparative Example 4 was prepared in a similar manner to Comparative Example 3 except two hexane washes were performed following the second titanation. In one embodiment the composition in weight percent was: Cl 53.0%; Al 2.3%; Mg 9.7% and Ti at 9.5%. Ranges for each element can be; Cl at 52.6–53.0%; Al at 2.0–2.3%; Mg at 9.7–10.6%; and Ti of 8.7–9.5%.

Table 2 lists the catalysts prepared.

TABLE 2

| Catalyst | X | Number of washes | Y | Number of washes |
|---|---|---|---|---|
| Comparative Example 1 | 0.5 | 0 | 0 | NA |
| Comparative Example 2 | 0.5 | 1 | 0.5 | 2 |
| Example 1 | 1.0 | 1 | 1.0 | 2 |
| Comparative Example 3 | 2.0 | 1 | 0 | NA |
| Comparative Example 4 | 2.0 | 2 | 0 | NA |

Table 3 gives the MWD data provided for polymers made with Example 1 and Comparative Examples 1 to 4. For a given catalyst/cocatalyst system, the data show that a narrower MWD can be attained by increasing the numbers of washes or addition of a third titanation step with $TiCl_4$. In general, the polymer resin intrinsic MWD increases in the following order Comparative Example 1<Comparative Example 2<Comparative Example 4<Example 1<Comparative Example 3.

TABLE 3

| Catalyst | Co-catalyst | Number of Washes following X | Number of Washes following Y | SR5 (HLMI/MI$_5$) | D (Mw/Mn) |
|---|---|---|---|---|---|
| Comparative Example 1 | TEA1 | 0 | 0 | 10.9 | 6.2 |
| Comparative Example 2 | TEA1 | 1 | 2 | 10.9 | NA |
| Example 1 | TEA1 | 1 | 2 | 12.6 | 6.8 |
| Comparative Example 3 | TEA1 | 1 | NA | 11.8–12.8 | 5.9–6.8 |
| Comparative Example 4 | TEA1 | 2 | NA | 10.8–12.0 | 6.0–6.3 |
| Example 1 | TIBA1 | 1 | 2 | 11.9 | 7.0 |
| Comparative Example 3 | TIBA1 | 1 | NA | 12.2–13.6 | 6.9–7.3 |
| Comparative Example 4 | TIBA1 | 2 | NA | 11.4–11.8 | 6.6–7.5 |

As shown in Table 4, each of the catalysts provides powder with low levels of fines (particles less than 125 microns); however, catalysts of the invention prepared with two titanation steps consistently provide fluff with higher bulk densities.

TABLE 4

| Catalyst | D$_{50}$ (microns) | Fluff D$_{50}$ (microns) | % Fines | B.D. (g/cc) |
|---|---|---|---|---|
| Comparative Example 1 | 9.4 | 260 | 0.0 | 0.38 |
| Comparative Example 2 | 7.8 | 237 | 0.6 | 0.40 |
| Comparative Example 4 | 10.1 | 287 | 1.6 | 0.34 |
| Example 1 | 9.2 | 264 | 0.6 | 0.38 |

Figure 1:
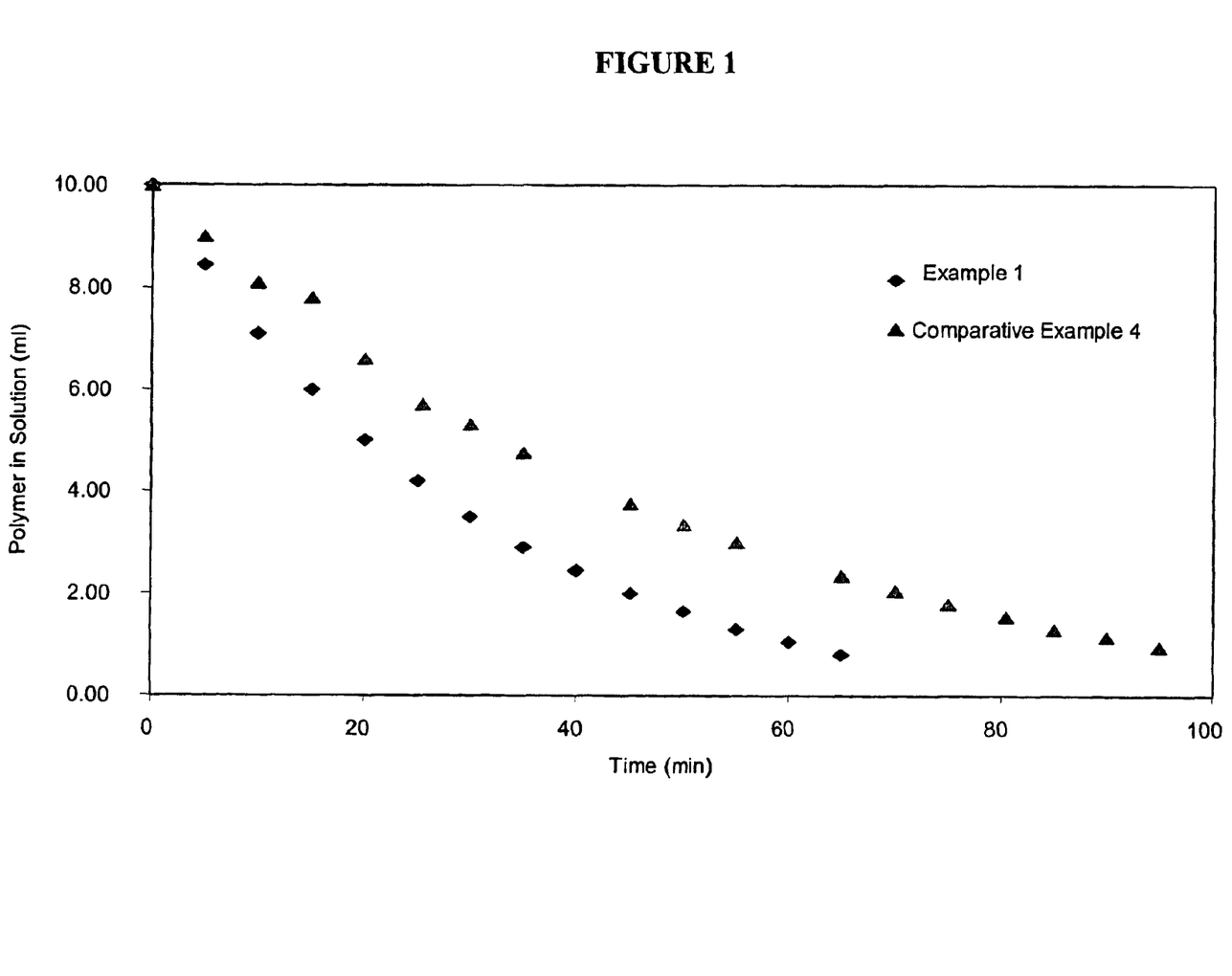
FIG. 1 illustrates the settling efficiency curves for polymer made using a catalyst of the invention (Example 1), and polymer made using a conventional catalyst (Comparative Example 4).

These properties have substantial effects on the settling efficiency of the polymer as demonstrated by the laboratory derived settling efficiency curves provided in FIG. 1. The rapid disappearance of the initial 10 ml of fluff from solution exhibited by the inventive polymer made with the inventive catalyst of Example 1 implies a greater settling rate and better polymer morphology than that made with conventional catalyst of comparative Example 4.

Viscosity Control of Synthesis Solution

It has been found that by varying the solution viscosity during catalyst synthesis, the precipitation of the catalyst component from the solution can be altered. This alteration of the precipitation of the catalyst component has been found to affect the resulting particle size of the catalyst and the polymer produced using the catalyst. The catalyst synthesis solution viscosity can be altered depending on the relative quantity of aluminum alkyl present. Therefore the particle size of the catalyst and the polymer produced from the catalyst can be altered depending on the relative quantity of aluminum alkyl used.

Catalysts were prepared with varying quantities of aluminum alkyl in the synthesis solution and were tested along with the resulting polymer fluff produced from the catalysts. Example 2 describes the synthesis used in the catalyst preparation and Table 5 shows the resulting catalyst and polymer sizes.

Example 2

The synthesis employed is as follows with all ratios relative to BEM:

1. $(BEM+X\ TEAl+0.6\ DIAE)+(2+3X)$ 2-ethylhexanol→$Mg(O\text{-}2\text{-ethhex})_2 \cdot [Al(O\text{-}2\text{-ethhex})_3]$
2. $Mg(O\text{-}2\text{-ethhex})_2 \cdot [Al(O\text{-}2\text{-ethhex})_3]+ClTi(OPr)_x →$ "A"
3. "A"$+2TiCl_4/Ti(Obu)_4 →$ "B" ($MgCl_2$ based support)
4. "B"$+Y\ TiCl_4 →$ "C";
5. "C"$+Z\ TiCl_4 →$ "D"
6. "D"$+0.156\ TEAl →$ catalyst Four catalysts were prepared in a one liter Buchi reactor according to this general synthesis with Y=Z=1. The quantities of TEAl were changed in the first reaction to study the resulting effect on the catalyst particle size. The relative amount of 2-ethylhexanol was adjusted during each catalyst synthesis to prevent the reduction of titanium complexes by any unreacted aluminum or magnesium alkyl species. The following table lists the catalysts synthesized, the relative amounts of BEM, TEAl, and 2-ethylhexanol employed, the average particle size for the catalysts and the average particle size of polyethylene resin produced using each catalyst.

The following table provides the particle size distribution data that was obtained for each catalyst. As shown, the average particle size distribution increases with increasing TEAl levels.

TABLE 5

| Catalyst | BEM Equivalents | TEA1 Equivalents | 2-ethylhexanol Equivalents | BEM:TEA1 ratio | Catalyst $D_{50}$ (microns) | Polymer Fluff $D_{50}$ (microns) |
|---|---|---|---|---|---|---|
| 101 | 1.0 | 0.03 | 2.09 | 1.0:0.03 | 13.0 | 399 |
| 102 | 1.0 | 0.3 | 2.9 | 1.0:0.3 | 16.1 | 420 |
| 103 | 1.0 | 0.5 | 3.5 | 1.0:0.5 | 18.3 | 418 |
| 104 | 1.0 | 1.0 | 5.0 | 1.0:1.0 | 21.7 | 504 |

As show in Table 5, the average particle size of both the catalyst and the resulting fluff increase with increasing TEAl levels utilized in the initial solutions of the catalyst synthesis. By varying the relative quantity of aluminum alkyl, the viscosity of the catalyst synthesis solution can be altered. The variance of the solution viscosity can thereby alter the precipitation properties of the catalyst component from the solution, which can affect the resulting average particle size of the catalyst component and the resulting polymer produced from this catalyst. It is seen that the average particle size of the catalyst component increases with an increased concentration of aluminum alkyl in the synthesis solution. It is also seen that the average particle size of the resulting polymer resin produced by the catalyst increases with an increased concentration of aluminum alkyl in the synthesis solution.

The quantity of aluminum alkyl can be measured in terms of the ratio of aluminum alkyl to magnesium alkyl, which can range from about 0.01:1 to about 10:1. Polyethylene produced using the above described catalyst can have an MWD of at least 4.0, and can be greater than about 6.0.

Catalyst 101 in Table 5 is the same as Example 1 as described above. In one embodiment the composition in weight percent was: Cl 53.4%; Al 2.3%; Mg 11.8% and Ti at 7.9%. Ranges for each element can be: Cl at 40.0–65.0%; Al at 0.0–6.0%; Mg at 6.0–15.0%; and Ti of 2.0–14.0%.

Catalyst 102 in Table 5 had in one embodiment: Cl 47.0%; Al 3.4%; Mg 13.1% and Ti at 4.0%. Ranges for each element can be: Cl at 40.0–65.0%; Al at 0.0–6.0%; Mg at 6.0–15.0%; and Ti of 2.0–14.0%.

Catalyst 103 in Table 5 had in one embodiment: Cl 50.0%; Al 2.4%; Mg 12.1% and Ti at 3.9%. Ranges for each element can be: Cl at 40.0–65.0%; Al at 0.0–6.0%; Mg at 6.0–15.0%; and Ti of 2.0–14.0%.

Catalyst 104 in Table 5 had in one embodiment: Cl 53.0%; Al 3.1%; Mg 12.8% and Ti at 4.2%. Ranges for each element can be: Cl at 40.0–65.0%; Al at 0.0–6.0%; Mg at 6.0–15.0%; and Ti of 2.0–14.0%.

The polyolefins of the present invention are suitable for use in a variety of applications such as, for example, an extrusion process, to yield a wide range of products. These extrusion processes include, for example, blown film extrusion, cast film extrusion, slit tape extrusion, blow molding, pipe extrusion, and foam sheet extrusion. These processes may comprise mono-layer extrusion or multi-layer coextrusion. End use applications that can be made utilizing the present invention can include, for example, films, fibers, pipe, textile material, articles of manufacture, diaper components, feminine hygiene products, automobile components and medical materials.

While the illustrative embodiments of the invention have been described with particularity, it will be understood that various other modifications will be apparent to and can be readily made by those skilled in the art without departing from the scope of the invention.

We claim:

1. A process for making a catalyst comprising:
   altering the precipitation of a catalyst component from a catalyst synthesis solution by controlling the viscosity of a catalyst synthesis solution with the addition of aluminum hydrocarbyl or substituted hydrocarbyl moieties, wherein the average particle size of the catalyst component increases with an increased concentration of aluminum hydrocarbyl or substituted hydrocarbyl moiety in the synthesis solution.

2. The process of claim 1 further comprising contacting the catalyst component with an organometallic preactivating agent to form a catalyst, wherein the average particle size of the catalyst increases with an increased concentration of aluminum hydrocarbyl or substituted hydrocarbyl moiety in the synthesis solution.

3. The process of claim 1 additionally comprising:
   contacting a magnesium dialkoxide compound with a halogenating agent to form a reaction product A; and
   contacting reaction product A with a series of halogenating/titanating agents to form a catalyst component; and
   contacting the catalyst component with an organometallic preactivating agent to form a catalyst;
   wherein the average particle size of the catalyst increases with an increased concentration of aluminum hydrocarbyl or substituted hydrocarbyl moiety in the synthesis solution.

4. The process of claim 3 wherein at least one of reaction product A and the resulting reaction products after each halogenating/titanating step are washed with a solvent to remove contaminants.

5. A process for making a catalyst comprising:
   a) contacting a magnesium dialkoxide compound with a halogenating agent to form a reaction product A;
   b) contacting reaction product A with a first halogenating/titanating agent to form reaction product B;
   c) contacting reaction product B with a second halogenating/titanating agent to form reaction product C; and
   d) contacting reaction product C with a third halogenating/titanating agent to form reaction product D; and
   e) contacting reaction product D with an organometallic preactivating agent to form a catalyst; wherein the magnesium dialkoxide compound is the reaction product of a magnesium alkyl compound of the general formula MgRR', wherein R and R' are alkyl groups of 1–10 carbon atoms and are the same or different, an alcohol of the general formula R"OH wherein the alcohol is linear or branched and wherein R" is an alkyl group of 2–20 carbon atoms, and an aluminum hydrocarbyl or substituted hydrocarbyl moieties of the formula AlR'''$_3$ wherein at least one R''' is an alkyl or alkoxide having 1–8 carbon atoms, and wherein each R''' is the same or different; and wherein the average particle size of the catalyst increases with an increased aluminum hydrocarbyl or substituted hydrocarbyl moiety to magnesium alkyl ratio.

6. The process of claim 5 wherein the ratio of aluminum alkyl to magnesium alkyl is in the range of about 0.01:1 to about 10:1.

7. The process of claim 5 wherein the halogenating/titanating agents of steps c) and d) each comprise titanium tetrachloride as the halogenating/titanating agents and the titanium tetrachloride to magnesium alkyl ratio is in the range of about 0.1 to about 5.

8. The process of claim 5 wherein the magnesium dialkoxide compound is a magnesium di(2-ethylhexoxide).

9. The process of claim 5 wherein the alkyl magnesium compound is diethyl magnesium, dipropyl magnesium, dibutyl magnesium or butylethylmagnesium.

10. The process of claim 5 wherein the alcohol is selected from the group consisting of ethanol, propanol, isopropanol, butanol, isobutanol, 2-methyl-pentanol, and 2-ethylhexanol.

11. The process of claim 5 wherein the organometallic preactivating agent comprises an aluminum alkyl.

12. The process of claim 5 wherein the first halogenating/titanating agent is a blend of two tetra-substituted titanium compounds with all four substituents being the same and the substituents being a halide or an alkoxide or phenoxide with 2 to 10 carbon atoms.

13. The process of claim 12 wherein the first halogentating/titanating agent is a blend of a titanium halide and an organic titanate.

14. The process of claim 13 wherein the first halogentating/titanating agent is a blend of TiCl$_4$ and Ti(OBu)$_4$ in a range from 0.5:1 to 6:1 TiCl$_4$/Ti(OBu)$_4$.

15. The process of claim 5 wherein the reaction further comprises contacting the magnesium dialkoxide and halogenating agent with an electron donor.

16. The process of claim 15 wherein the ratio of electron donor to magnesium dialkoxide is in the range of about 0:1 to about 10:1.

17. The process of claim 15 wherein the electron donor is an ether.

18. The process of claim 5 wherein the halogenating agent is of the general formula ClAR'''$_x$, wherein A is a nonreducing oxyphilic atom, R''' is a hydrocarbyl or substituted hydrocarbyl moiety having from about 2 to 6 carbon atoms, and x is the valence of A minus 1.

19. The process of claim 18 wherein the halogenating agent is ClTi(O'Pr)$_3$.

20. The process of claim 5 wherein at least one of the reaction products A, B, C and D are washed with a hydrocarbon solvent by agitation of the reaction product in the solvent, allowing the reaction product to settle and decanting the solvent, until titanium species [Ti] content is less than about 100 mmol/L in the decanted solvent.

21. The process of claim 5 wherein an electron donor is present in any one or more of steps a), b), c), or d), and wherein the ratio of electron donor to magnesium alkyl is in the range of about 0:1 to about 10:1.

22. The process of claim 5 further comprising placing the catalyst of the invention on an inert support.

23. The process of claim 22 wherein the inert support is a magnesium compound.

24. A catalyst produced by a process comprising:

contacting a catalyst component with an organometallic preactivating agent, wherein the catalyst component is produced by a process comprising, i) contacting a magnesium dialkoxide compound of the general formula Mg(OR''')$_2$ with a halogenating agent capable of exchanging one halogen for one alkoxide to form a reaction product A, where R''' is a hydrocarbyl or substituted hydrocarbyl having from 1 to 20 carbon atoms;

ii) contacting reaction product A with a first halogenating/titanating agent to form reaction product B;

iii) contacting reaction product B with a second halogenating/titanating agent to form reaction product C; and iv) contacting reaction product C with a third halogenating/titanating agent to form a catalyst component;

wherein the magnesium dialkoxide compound is the reaction product of a reaction comprising combining a magnesium alkyl compound of the general formula MgRR', wherein R and R' are alkyl groups of 1–10 carbon atoms and are the same or different, an alcohol of the general formula R"OH wherein the alcohol is linear or branched and wherein R" is an alkyl group of 2–20 carbon atoms, and an aluminum alkyl of the formula AlR'''$_3$ wherein at least one R$^4$ is an alkyl or alkoxide having 1–8 carbon atoms, and wherein each R$^4$ is the same or different; and wherein the average particle size of the catalyst increases with an increased aluminum alkyl to magnesium alkyl ratio.

25. The catalyst of claim 24 wherein the ratio of aluminum to titanium in the final product is in the range from 0.1:1 to 2:1.

26. The catalyst of claim 24 wherein the organometallic preactivating agent is a trialkyl aluminum.

27. The catalyst of claim 24 wherein the second and third halogenating/titanating agents comprise titanium tetrachloride.

* * * * *